United States Patent [19]
Matthews

[11] Patent Number: 5,494,368
[45] Date of Patent: Feb. 27, 1996

[54] FASTENER

[76] Inventor: Norman L. Matthews, 7 Marlin Court, Dalkeith, W.A. 6009, Australia

[21] Appl. No.: 50,164

[22] PCT Filed: Sep. 12, 1991

[86] PCT No.: PCT/AU91/00420

§ 371 Date: Apr. 30, 1993

§ 102(e) Date: Apr. 30, 1993

[87] PCT Pub. No.: WO92/04549

PCT Pub. Date: Mar. 19, 1992

[30] Foreign Application Priority Data

Sep. 12, 1990 [AU] Australia .................................. PK2270
Apr. 11, 1991 [AU] Australia .................................. PK5584

[51] Int. Cl.[6] .................. F16B 35/00; B27B 5/32; B24B 45/00
[52] U.S. Cl. .................. 403/259; 403/256; 403/322; 403/321; 451/64
[58] Field of Search ................... 411/428, 435, 411/402, 542, 915, 534; 51/168, 376, 377; 403/256, 259, 24, 17–20, 325, 322, 321

[56] References Cited

U.S. PATENT DOCUMENTS

| | | |
|---|---|---|
| 1,788,634 | 1/1931 | Robinson . |
| 1,944,489 | 1/1934 | Bockshe . |
| 2,512,970 | 6/1950 | Rogne . |
| 3,353,306 | 11/1967 | Seymour et al. . |
| 3,805,661 | 4/1974 | Tuomaala . |
| 4,362,449 | 12/1992 | Hlinsky . |
| 4,650,364 | 3/1987 | Kark .................. 403/259 |
| 4,955,744 | 9/1990 | Barth et al. ............... 51/168 |
| 4,969,788 | 11/1990 | Goiny .................. 411/428 |
| 4,976,071 | 12/1990 | Städler . |
| 5,042,207 | 8/1991 | Kim .................. 51/168 |
| 5,161,334 | 11/1992 | Schaal et al. ............. 51/168 |

FOREIGN PATENT DOCUMENTS

| | | |
|---|---|---|
| 8983 | 2/1947 | Australia . |
| 0102259 | 3/1984 | European Pat. Off. . |
| 0130896 | 1/1985 | European Pat. Off. . |
| 0106711 | 4/1985 | European Pat. Off. . |
| 2074455 | 9/1971 | France . |
| 410177 | 11/1974 | U.S.S.R. . |
| 1317319 | 5/1973 | United Kingdom . |
| 2172823 | 10/1986 | United Kingdom . |
| WO88/04596 | 6/1988 | WIPO . |

*Primary Examiner*—Anthony Knight
*Attorney, Agent, or Firm*—Nixon and Vanderhye

[57] ABSTRACT

A fastener (50) is disclosed suitable for securing a grinding wheel (92) to the spindle of an angle grinder, the fastener (50) being capable of tightening and loosening by hand. The fastener (50) comprises a first disc-shaped component (52) having a first pressure transmitting surface (53) adapted to bear against the grinding wheel (92), and a second disc-shaped component (54) having a threaded hub (56) non-rotatably fixed thereto. The first and second components (52, 54) are assembled on the hub (56) so as to be rotatable with respect to each other, and the second component (54) is adapted to apply an axially directed compressive force to press the first component (52) against the grinding wheel when a torque is applied to the second component (54). A solid dry lubricant washer (62) is provided between facing surfaces of said first and second components (52, 54) in an annular recess (64) immediately adjacent the hub (56), for reducing friction when one of the components (52, 54) is rotated relative to the other (54, 52). The lubricant washer (62) can ensure that a significantly increased proportion of the torque applied to the second component (54) is converted to compressive force transmitted through the first component (52) to the grinding wheel (92). A gripping device in the form of a flap (72) is pivotally connected to the second component (54), and is capable of pivoting to an upright position in which the flap (72) can be manually grasped to apply a torque to the fastener.

18 Claims, 4 Drawing Sheets

FASTENER

FIELD OF THE INVENTION

The present invention relates to an improved fastener, and relates in particular, though not exclusively, to a threaded fastener suitable for fastening a grinding wheel, circular saw blade or carving disc to the spindle of a power tool.

BACKGROUND TO THE INVENTION

With a conventional threaded fastener, for example, in the form of a nut, a significant proportion of the energy required to tighten the nut on a threaded spindle of a bolt or the like, is dissipated due to friction between the nut and the surface of an object to be fastened. This means that the torque required to achieve the necessary "tightness" of the nut, (i.e. the hold-down pressure exerted by the nut on the object to be fastened), can be up to fifty percent greater than would otherwise be necessary. For this reason, special tools such as, for example, a long spanner or an adjustable torque wrench, are used to provide the torque necessary to overcome the friction and still achieve the desired hold-down-pressure. For the same reason a special tool is usually required to unfasten the nut as well.

It was hitherto thought that maximum friction is required between the nut and the fastened object in order to ensure that the nut and/or the object did not come unfastened in use. A recent discovery suggests that this may not be the case, and that provided sufficient hold-down pressure is exerted by the action of the nut against the fastened object, the nut will remain fastened due to the reactive tensioning thereof and the frictional grip on the thread of the spindle on which the nut is threaded. In many situations, the object to be fastened cannot rotate relative to the spindle, for example, because it is keyed to the spindle, so that the possibility of the nut unfastening by itself is significantly reduced anyway. However, the discovery that little or low friction is required between the nut and the fastened object to keep the nut fastened, makes it desirable to minimize such friction so that more of the torque is available to be converted to hold-down pressure.

U.S. Pat. No. 4,969,788 discloses a nut with a pressure ring of the type having a spherically shaped undersurface for engagement with a complementary shaped depression in the component to be fastened. The invention seeks to overcome problems associated with conventional slit pressure rings which are normally a separate component from the nut. A nut with a closed pressure ring connected thereto is provided, the means of connection permitting the nut and ring to rotate relative to one another about the nut axis and to shift relative to one another laterally of the nut axis. The nut and the pressure ring have confronting pressure transmitting surfaces, and at least one of the pressure transmitting surfaces is provided with a plurality of recesses for holding lubricant. This can be achieved for example by shot peening the pressure transmitting surface. According to U.S. Pat. No. 4,969,788, in this manner the shot peened pressure transmitting surface can be provided with a permanent lubricating film whereby friction between the nut and the pressure ring is not of the same magnitude as with a slit pressure ring and a debasing of the hold-down-torque during tightening of the bolt is reduced. The opposite confronting pressure transmitting surface is preferably finely turned or polished.

Presumably the lubricant employed is a liquid or viscous lubricant, for example grease, so that if the recesses in the shot peened surface are filled with the lubricant, as the nut and pressure ring are rotated relative to one another some of the lubricant in the recesses sticks to the confronting surface and is spread as a thin film between the pressure transmitting surfaces in known manner. This may prove satisfactory for a time, however after repeated use many of the recesses will be evacuated of lubricant and some of the lubricant will have been squeezed out from between the confronting surfaces so that little or no lubricant is left to form the thin film therebetween. Furthermore, liquid and viscous lubricants are prone to dry out and solidify over time. Accordingly, the hold-down-torque of the nut and pressure ring of U.S. Pat. No. 4,969,788 will be progressively debased during repeated tightening and loosening. More importantly, the liquid or viscous lubricant is unable to hold the two confronting surfaces fully apart so that there will always be a degree of metal to metal contact with the attendant friction therebetween. This problem is only exacerbated as the amount of lubricant between the pressure transmitting surfaces decreases over time.

The present invention was developed with a view to providing an improved fastener in which an increased proportion of the torque required to fasten an object can be converted to pressure applied to the object, even during, and especially for, repeated tightening and loosening. Advantageously, the improved fastener can also be readily fastened by hand since less torque is required to achieve the same hold-down pressure as a conventional fastener thus the need for a tool to fasten or unfasten the fastener may be eliminated. The remainder of the specification will be directed primarily to one application of the invention, namely fastening a rotary tool such as a grinding wheel, circular saw, carving disc or router blade to a power tool, however it will be appreciated that the invention has much wider application, for example, in the automotive industry.

A conventional clamp nut used for securing a grinding wheel to the spindle of an angle grinder is threaded through its central axis and cooperates with a washer-like backing plate which precedes the wheel onto the spindle. Shoulders provided on the spindle lock the backing plate to the spindle, and as the clamp nut is screwed onto the spindle it applies pressure to the wheel so that it is clamped against the backing plate and hence secured to the spindle. Conventionally, the friction grip of the plate on the grinding wheel when the nut is tightened prevents the wheel from turning on the spindle. A spanner or similar tool may be used to tighten the nut securely. Moreover, the clamp nut will also tighten spontaneously during use as the grinding wheel counter rotates relative to the direction of rotation of the spindle, when the wheel engages the work piece, so much so that it can be extremely difficult to remove the nut after use. Several improved types of fastener are known which are intended to eliminate the need for a special tool to loosen the fastener on the spindle and to make it easier to replace the grinder wheel or carving disc.

For example, AU 12247/88 (594557) by ROBERT BOSCH GmbH discloses a clamping device for axial clamping of a disc onto a flange of a spindle of a power tool. The clamping device comprises a clamp nut which can be screwed onto the spindle of a power tool, such as a portable grinder, and which supports a non-rotatable and axially movable clamp disc. The clamp disc engages the grinding wheel and is adapted to be loaded by the clamp nut with an axially directed compressive force and thus to press axially against the grinder wheel. An operating member is disposed between the clamp nut and the turning movement of the operating member axially releases the clamp disc from a clamped condition. Thus, the clamping device of AU12247/

88 (594557) can facilitate easy release of the clamp nut by hand even when the latter is locked tight on the tool spindle. However, in certain circumstances a special tool may still be required, for example, when the clamping device is in a rusted-on state or is used in the unlock position. Furthermore, the construction of the clamping device is extremely complicated with many moving parts and it is therefore expensive to manufacture. Moreover the operating member must protrude sufficiently outwards from the grinding wheel in order to be gripped by the operator's hand and therefore presents an inconvenient obstruction during use. Also this clamping device is prone to spontaneously overtighten with the turning of the grinding wheel and this is known to cause failure of the grinding wheel, apart from the usual problems of overtightening.

SUMMARY OF THE INVENTION

An object of the present invention is to provide a fastener in which significantly less of the torque is required to overcome friction when tightening and loosening the fastener.

Another object of the present invention is to provide a gripping device which facilitates manual tightening and loosening of a fastener.

According to one aspect of the present invention there is provided a fastener comprising:

first and second components assembled so as to be rotatable with respect to each other about a common axis, said first component having a first pressure transmitting surface adapted to bear against an object to be fastened and said second component having a threaded portion and being adapted to apply an axially directed compressive force to press the first component against said object when a torque is applied to said second component;

a solid dry lubricant material having a low coefficient of friction provided between said first and second components to reduce friction therebetween when one of the components is rotated relative to the other whereby, in use, said solid dry lubricant material can ensure that a significantly increased proportion of the torque applied to said second component to fasten said object can be converted to said compressive force transmitted through said first surface to said object; and, containment means provided in connection with said first and/or second components for containing said solid dry lubricant material therein whereby, in use, said solid dry lubricant material is capable of withstanding substantial compressive loads without being extruded from between the first and second components.

Advantageously, said lubricating means comprises a solid dry lubricant, for example, a fluoropolymer plastic having a low coefficient of friction such as polytetrafluoroethylene (PTFE), commonly known by the trade names FLUON and TEFLON.

Preferably said solid dry lubricant is in the form of a separate thin layer provided between facing surfaces of said first and second components. In a preferred embodiment said first and second components are substantially circular in shape, and typically comprise first and second disc-shaped components respectively. The second disc-shaped component may be provided with a hub which is received in an aperture provided in the first disc-shaped component whereby said first and second disc-shaped components share a common axis of rotation. Advantageously said solid dry lubricant is in the form of a closed ring located concentrically between said disc-shaped components and lying immediately adjacent an outer periphery of said hub.

Either one of the disc-shaped components may be provided with an annular recess sized to receive said dry lubricant ring therein, and the other one of the disc-shaped components may have a matching spigot adapted to bear against the ring in said annular recess, wherein the height of said spigot relative to the depth of said annular recess is selected so that the remainder of the substantially planar, facing surfaces of said components are normally separated by an air gap.

Advantageously said spigot and said annular recess each provide the only pressure transmitting surfaces on the facing surfaces of the first and second components.

According to another aspect of the present invention there is provided a gripping device for manual tightening and/or loosening of a fastener, the device being provided integral to the fastener and comprising:

a substantially planar member pivotally connected to the fastener with the axis of pivot lying in a pivot plane substantially perpendicular to a direction of fastening of the fastener, said member being capable of pivoting about said pivot axis to an upright position in which it lies substantially parallel to the direction of fastening whereby, in use, said member can be manually grasped to apply a torque to the fastener, said pivot axis being proximate a torque transmitting surface provided substantially perpendicular to said pivot plane, said member being adapted to engage said torque transmitting surface in its upright position whereby, in use, when a torque is applied to the fastener by said member the load is carried substantially by said torque transmitting surface.

Preferably said fastener is provided with a groove in which said pivotal connection of said planar member is located, the sides of said groove forming said torque transmitting surface, wherein said torque can be transmitted to the fastener by means of said planar member engaging the sides of said groove.

Advantageously said axis of pivot passes through a central axis of the fastener, said central axis being parallel to said direction of fastening. Typically said fastener is a threaded fastener and has a top portion having a generally planar upper surface, said device being integral with said top portion. Typically said upper surface is of circular shape and said substantially planar member is in the form of a flap of semi-circular shape, said pivot axis lying on a diametrical axis of said upper surface. Advantageously said upper surface is provided with a recessed portion adapted to receive said flap in a lowered position, in which it lies flat in a plane substantially perpendicular to the direction of fastening.

Preferably said pivotal connection of said flap is provided with biasing means for biasing said flap towards its lowered position.

BRIEF DESCRIPTION OF DRAWINGS

In order to facilitate a better understanding of the nature of the present invention several embodiments of a fastener according to the invention will now be described in detail, by way of example only, with reference to the accompanying drawings, in which.

Figure 1:
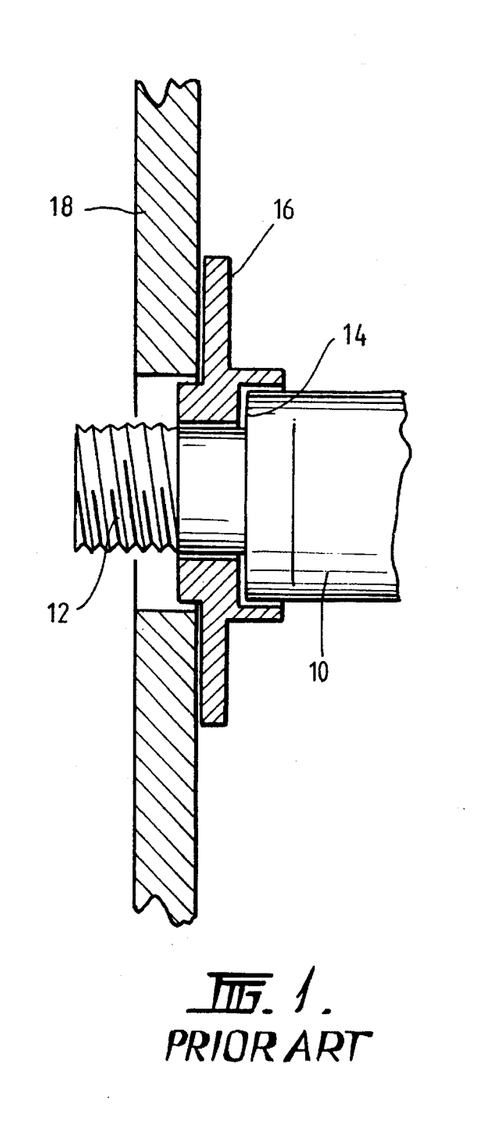
FIG. 1 is a part-section view of a grinder wheel on the spindle of an angle grinder power tool.
Figure 2:
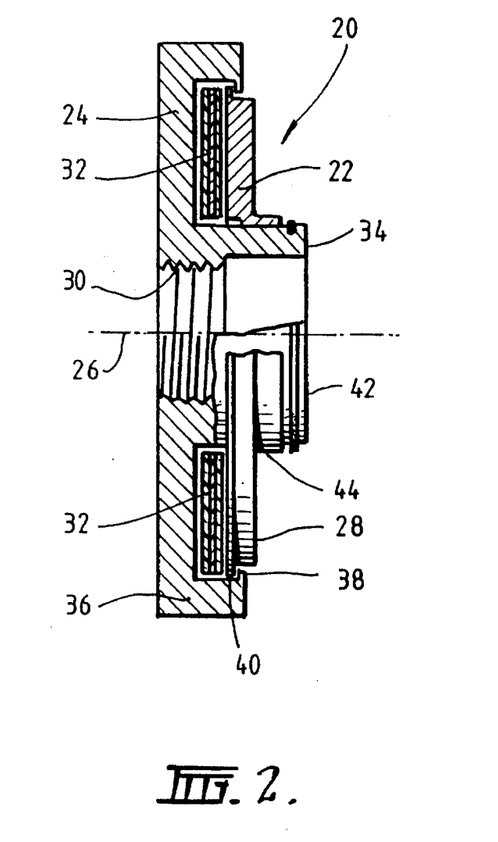
FIG. 2 is a section view through one embodiment of a fastener according to the present invention, that can be used to fasten the grinder wheel of FIG. 1.

Referring to FIG. 1, a spindle 10 of an angle grinder is illustrated having a threaded portion 12 and a shoulder 14 against which a washer-like backing plate 16 is seated. A grinder wheel or disc 18 is received on the backing plate 16. In the conventional means of fastening the grinder wheel 18 to the spindle 10, an appropriately shaped flange provided integral to a conventional clamping nut (not shown), is screwed onto the threaded portion 12 of the spindle and applies pressure to the wheel 18 through the flange so that the wheel is clamped against the backing plate 16 and hence secured to the spindle. A suitable tool must be used to tighten and loosen the clamp nut to the spindle in order to secure and release the grinding wheel 18. FIG. 2 illustrates one embodiment of an improved fastener 20, according to the present invention, in the form of a clamping nut.

The fastener 20 comprises a first component 22 and a second component 24 assembled so as to be rotatable with respect to each other about a common axis 26, the first component 22 having a first pressure transmitting surface 28 adapted to bear against the grinder wheel 18. The second component 24 has a threaded portion 30 for threadably engaging a threaded portion 12 of the spindle 10, and is adapted to transmit pressure through the first component 22 to fasten the grinder wheel to the spindle 10 when a torque is applied to the second component 24. A lubricating means 32 is provided between the first and second components 22, 24 to substantially reduce friction therebetween when one of the components is rotated relative to the other.

In this embodiment, the lubricating means takes the form of three washers 32 of solid dry lubricant, for example, a fluoropolymer plastic having a low coefficient of friction such as PTFE, commonly known as TEFLON. In an alternative arrangement, the facing pressure transmitting surfaces of the first and second components 22, 24 are each coated with teflon and then a further teflon washer is imposed therebetween. In a still further alternative arrangement, a single teflon washer 32 is provided and the facing pressure transmitting surfaces of the first and second components 22, 24 are both finally turned or smoothly polished. In use, it is found that some of the teflon material from the washer deposits onto the component surfaces, thus further reducing friction therebetween. Typically, the first and second components are manufactured from stainless steel and the opposing pressure transmitting faces are provided with a close grain, smooth finish. A solid dry lubricant material such as teflon is particularly advantageous because it is lightweight, is chemically inert, is unaffected by changes in ambient temperature, including temperatures below freezing, can be of small dimensions, is non-corrosive and unlike liquid and viscous lubricants is resistant to contamination or dehydration. The washers 32 ensure that a substantially increased proportion of the torque applied to the second component 24 is converted to pressure transmitted through the surface 28 of the first component 22 to the grinding wheel 18. The teflon washer also helps prevent the grinding wheel from spontaneously loosening when the tool is switched off and the spindle decelerates.

In this embodiment the first and second components 22, 24 are assembled with the first component 22 received on a hub 34 of the second component 24, and with the first component 22 effectively housed within the threaded component 24 but having the first pressure transmitting surface 28 exposed, so that only the surface 28 contacts the grinding wheel 18. The second component 24 is provided with a circumferential rim 36 having an inner circumferential lip 38 for engaging a corresponding outer circumferential lip 40 provided on the outer periphery of the first component 22. Thus, the teflon washer(s) 32 are effectively sealed within the annular space between the first and second components 22, 24. The circumferential lips 38 and 40 are manufactured with close tolerances in order to inhibit the ingress of dust or other dirt particles into the space between the first and second components 22, 24. As the teflon washer(s) 32 is compressed between the first and second components 22, 24 when the fastener is tightened, the teflon material is effectively contained and prevented from spreading inwards by the hub 34, and from spreading outwards by the circumferential rim 36 of the second component.

The first and second components are secured in their assembled condition by a circlip 42 received on the hub 34 of the threaded component 24. The first component 22 is also provided with a shoulder 44 which together with the hub 34 and circlip 42 is received within the central mounting hole of the grinding wheel 18. Due to the provision of the solid dry lubricant washer 32, as the threaded component 24 is screwed onto the spindle 10 of the angle grinder, significantly less torque is required to overcome face to face friction and accordingly a substantially increased proportion of the torque is transmitted through the first component 22 to fasten the grinding wheel to the spindle. Indeed, less torque need be applied to the second component 24 in order to achieve adequate hold-down pressure, so that the fastener 20 can be tightened manually simply by grasping and turning the second component 24. For this purpose, the second component 24 may be provided with a suitable grip surface to facilitate manual tightening and loosening of the fastener 20. The outside diameter of the second component 24 may be increased to improve the mechanical advantage. A more preferred embodiment of the fastener according to the present invention will now be described with reference to FIGS. 3 to 7.

Figure 3:
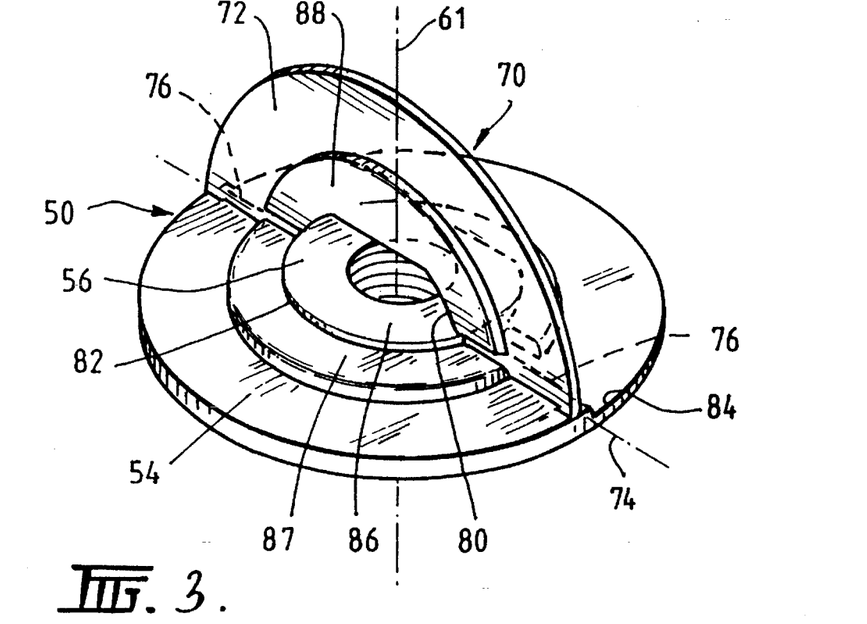
FIGS. 3 and 4 are a top perspective view and a bottom perspective view respectively of a more preferred embodiment of the fastener, incorporating a gripping device also according to the present invention; and, FIG. 5 is an exploded part section view of the fastener of FIGS. 3 and 4.
Figure 4:
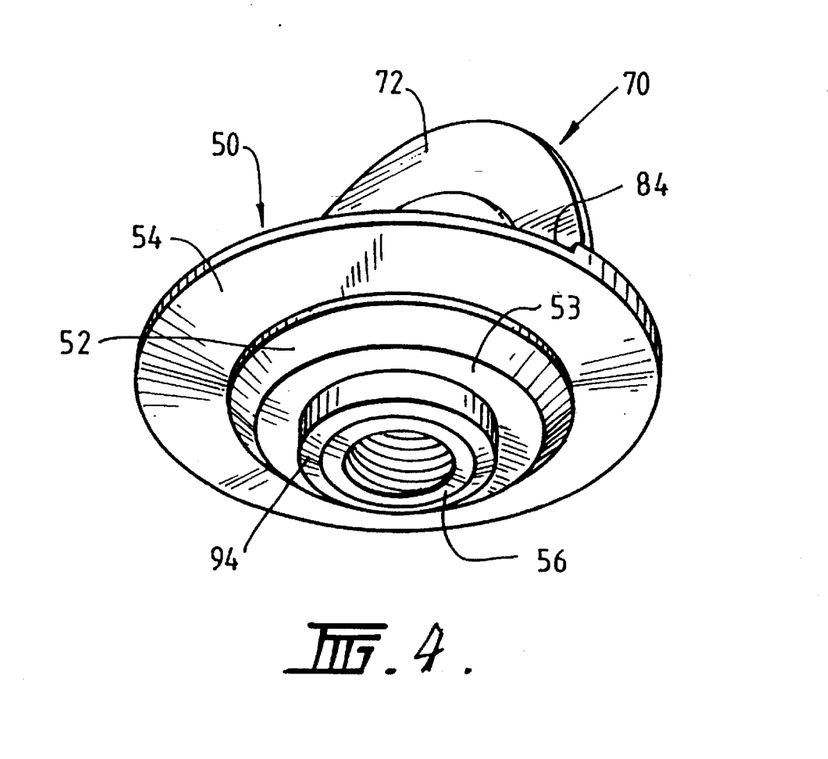
Figure 5:
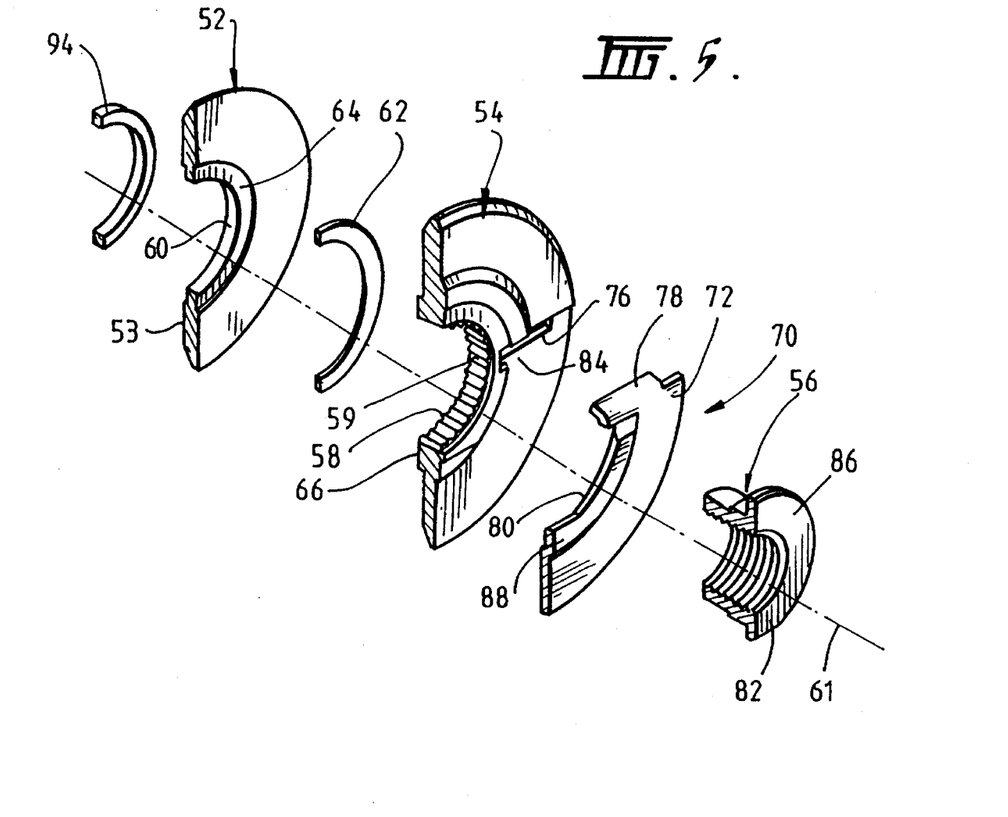

The fastener 50 illustrated in FIGS. 3, 4, 5 and 6 comprises a first disc-shaped component 52 having a first pressure transmitting surface 53 adapted to bear against an object to be fastened. The fastener 50 comprises a second disc-shaped component 54 provided with a threaded portion in the form of a hub 56 received through a central aperture 58 of the second component 54. The first component 52 is also provided with a central aperture 60 having an inside diameter slightly larger than the outside diameter of the hub 56. The first and second components 52, 54 are assembled on the hub 56 so as to be rotatable with respect to each other about a common axis 61, and the second component 54 is locked to the hub 56 so that when a torque is applied to the second component as it is screwed onto a spindle, compressive force is transmitted through the first component 52 in an axial direction to fasten the object against which the pressure transmitting surface 53 is bearing. As can be seen in FIG. 5 splines 59 are provided on the internal circumferential surface of the aperture 58 of the second disc-shaped component 52. The splines 59 cut into the external circumferential surface of the hub 56 in order to lock the two parts together in known manner. The disc-shaped component 54 can be locked to the hub 56 in any known manner. An outer ring 94 holds the components together in their assembled condition.

Lubricating means in the form of a solid dry lubricant is provided between the first and second components to substantially reduce friction therebetween when one of the components is rotated relative to the other. In this embodiment the solid dry lubricant is in the form of a closed washer-like ring 62. Advantageously, the washer-like ring 62 is manufactured from a fluoropolymer plastic having a low coefficient of friction, such as PTFE, commonly known as TEFLON. The TEFLON washer 62 is located concentrically between the first and second components 52, 54 and lies immediately adjacent an outer periphery of the hub 56. The washer 62 is of minimum area in order to minimize the contact area between the facing pressure transmitting surfaces of the first and second components and thus reduce friction therebetween. For example, the TEFLON washer 62 in the preferred embodiment is approximately 2 mm wide and 0.5 mm thick. The washer 62 is preferably located immediately adjacent the outer periphery of the hub 56 in order to maximize the mechanical advantage obtained when a torque is applied to the relatively large diameter second disc-shaped component 54.

The first disc-shaped component 52 is provided with an annular recess 64 sized to receive the TEFLON washer 62 therein. The annular recess 64 opens out into the central aperture 60 of the first component 52. The second component 54 is provided with a matching spigot 66 adapted to bear against the washer 62 in the annular recess 64. The height of the spigot 66 relative to the depth of the annular recess 64 is selected so that the remainder of the substantially planar facing surfaces of the first and second components 52, 54 are normally separated by an air gap. Hence, the spigot 66 and annular recess 64 each provide the only pressure transmitting surfaces on the facing surfaces of the first and second components, and thus prevent metal to metal contact between the first and second components 52, 54.

The annular recess 64 together with the spigot 66 and the outer peripheral wall of the hub 56 together contain the TEFLON washer 62 and prevent spreading of the solid lubricant material when a load is applied thereto. With the teflon washer 62 thus contained, the solid dry lubricant material can withstand twice the normal load. The teflon washer 62 also engages the outer peripheral wall of the hub 56 to maintain a sealing relationship therebetween and thus prevent the entry of contaminants such as dust and other particles. Furthermore, the washer 62 can also act as a bearing to inhibit metal to metal contact between the inner circumferential surface of the aperture 58 and the outer peripheral wall of the hub 56. The inside diameter of the washer 62 can be made equal to the outside diameter of the hub and slightly larger than the inside diameter of the aperture 58 in the disc-shaped component 54, in order to prevent the component 54 moving laterally of the common axis of the fastener. Both the components 52, 54, the hub 56 and the washer 62 are manufactured to close tolerances, typically to within five thousandth of an inch to prevent contaminants from entering between the components. Obviously the annular recess 64 need not be provided immediately adjacent the hub 56, but may be spaced therefrom, but preferably not too distant from the hub in order to retain the mechanical advantage. The annular recess 64 is less than substantially one-quarter of the radius of the second component 54.

Figure 6:
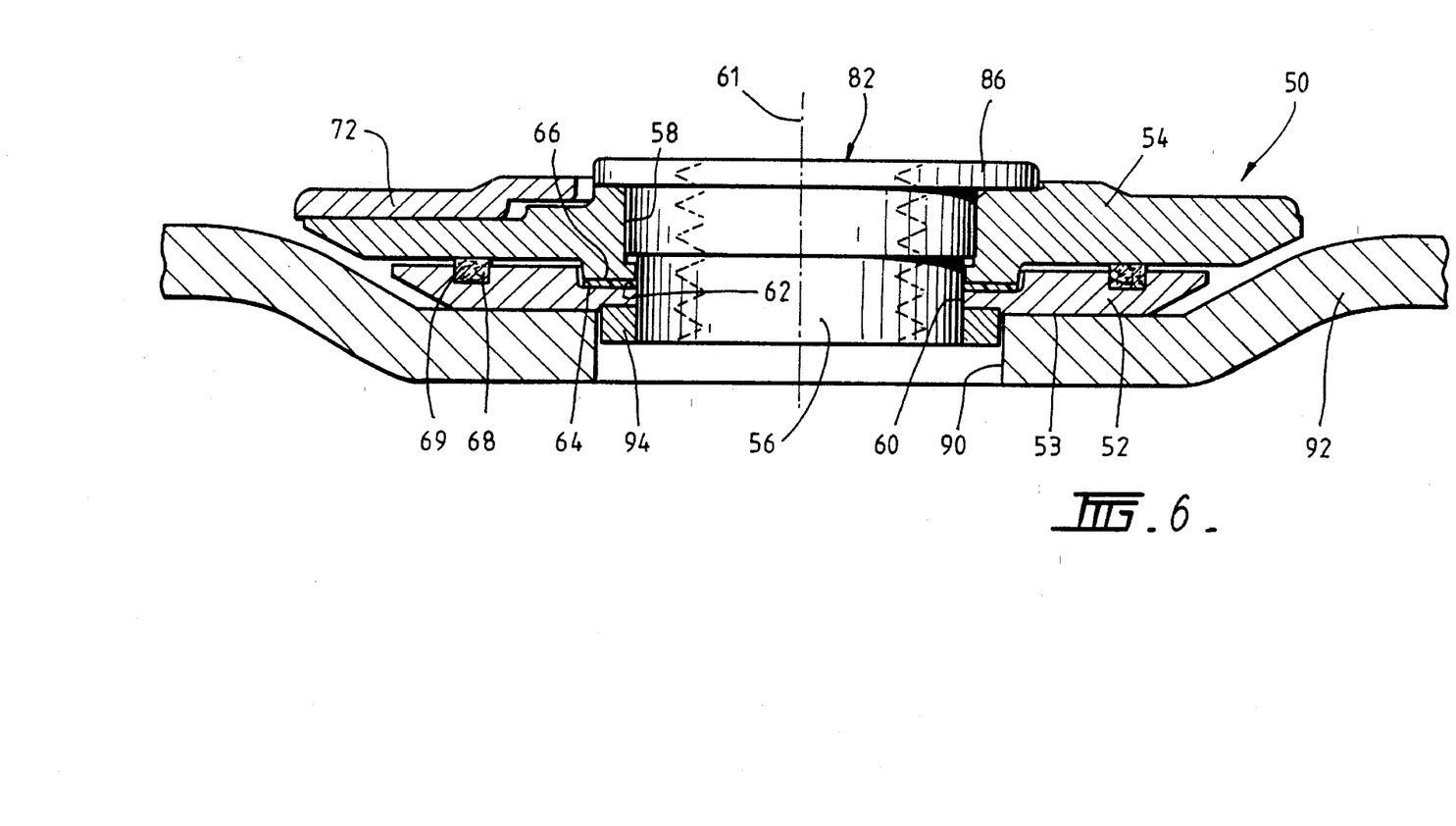
FIG. 6 is a part section view of the fastener of FIG. 5 fitted to a grinder wheel; and, FIG. 7 is an enlargement of a preferred form of hinge connection for the flap on the fastener of FIGS. 3 to 6.

As illustrated in FIG. 6 the first component 52 may be provided with an annular groove or recess 68 (see FIG. 6) intermediate the aperture 60 and the outer periphery of the first component 52 and adapted to receive a felt dust washer 69 impregnated with a viscous lubricant, such as grease, to exclude dust. FIG. 6 illustrates a part section view of the fastener assembly received in an aperture 90 of a grinding wheel. The outer ring 94 is press fit onto a protruding portion of the hub 56 and holds the first and second components 52, 54 together so that they are free to rotate about the common axis 61. A second teflon washer may be provided between the outer ring 94 and the first component 52 in order to minimize friction therebetween if necessary. Advantageously the outside diameter of the outer ring 94 is sized to fit in the aperture 90 of the grinding wheel and thus also serves to center the wheel 92 on the spindle of the tool. Hence, the outside diameter of the hub 56 can be kept to a minimum. In FIG. 6 it can also be seen most clearly how the disc-shaped components 52, 54 help to give the fastener 50 an overall low profile that only protrudes slightly above the central depression provided in the grinding wheel 92.

The second component 54 is preferably manufactured from close grained stainless steel turned or polished to a smooth finish, whereas the first component may be manufactured from ordinary steel or other suitable rigid material. Obviously the various components of the fastener can be manufactured from any suitable materials, whether metal or ceramic or plastics as well as combinations thereof. As noted above, some of the teflon material of the washer 62 will deposit in use on the adjacent pressure transmitting surfaces of the annular recess 64 and the spigot 66, thus further reducing any friction therebetween.

The operation of the fastener 50 is similar to that of the first embodiment described above. The second component 54 is screwed onto the spindle to which it is to be fastened by means of the threaded hub 56 until the first pressure transmitting surface 53 of the first component 52 bears against the object to be fastened. The first component 52 thereafter remains substantially stationery whilst the second component 54 can be tightened to obtain the required tensioning on the spindle. Since the friction between the first and second components is minimized by the action of the teflon washer 62 substantially all of the torque applied to the second component 54 is converted to a hold-down pressure applied to the object to be fastened through the first component 52. This embodiment of the fastener 50 also incorporates a novel gripping device for easy gripping and manual tightening and/or loosening of the fastener.

The gripping device 70 is provided integral to the fastener 50 and comprises a substantially planar member in the form of a flap 72. The flap 72 is pivotally connected to the fastener with the axis of pivot 74 lying in a plane substantially perpendicular to a direction of fastening of the fastener. The flap 72 is capable of pivoting about the pivot axis 74 to an upright position in which it lies substantially parallel to the direction of fastening and substantially perpendicular to the upper surface of the second component 54, so that the flap 72 can be manually grasped to apply a torque to the second component 54. The flap 72 is of generally semi circular shape in order to match the shape of the upper surface of the second component 54 of the fastener. The upper surface of the second component 54 is provided with a groove 76 within which the pivotal connection of the flap 72 is located so that a torque applied to the flap 72 can be transmitted to the fastener by means of the flap 72 engaging the sides of the groove 76. The groove 76 is provided in two sections lying on a diametrical axis of the second component 54 and are shaped to receive a corresponding pair of projecting hinge portions 78 on the flap 72. The flap 72 is provided with a cut-out section 80 shaped to accommodate the head 82 of the threaded hub 56 of the fastener, when the flap 72 is in its lowered position.

Advantageously, the upper surface of the second component 54 is provided with a recessed portion 84 adapted to receive the flap 72 in its lowered position, in which it lies flat in a plane substantially perpendicular to the direction of fastening. The hinge portions 78 on flap 72 project inwardly and are arranged to be held in the two sections of the groove 76 by means of an annular flange 86 provided on the head 82 of the threaded hub 56 in its assembled condition. Thus, the groove 76, flange 86 and projecting hinge portions 78 of the flap 72 effectively provide a hinge connection for the gripping device 70. In an alternative arrangement the hinge portions 78 project outwardly and the hub 56 is not provided as a separate part from the disc-shaped component 54. Advantageously the hinge connection is achieved simply by bending the projecting hinge portions 78 of the flap downwards to be received in the groove 76. This eliminates the need for a pivot pin.

Figure 7:
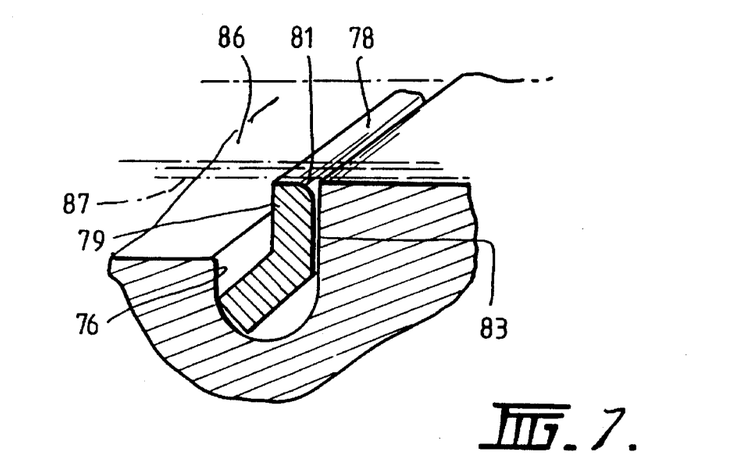

As can be seen most clearly in FIG. 7 the projecting hinge portions 78 of flap 72 also have an angled configuration, so that the geometry of the hinge connection enables effectively double the thickness of the flap 72 at the hinge pivots. The angled configuration of projecting hinge portion 78 ensures that the projecting ear 79 of the hinge portion is free to pivot within the confines of the space defined by the groove 76 and the flange 86 without compromising the strength of the ear 79. The ear 79 is provided with a rounded edge 81 to enable it to pivot freely within the confined space beneath the flange 86 of the hub 56. In FIG. 7 the flap is in its upright position. The flap is prevented from pivoting beyond its upright position by the projecting hinge portions 78 engaging the upright wall 83 of the groove 76. Advantageously the height of the upright wall 83 is increased in the region of the ear 79 by a raised annulus 87 on the upper surface of the second component 54, which matches a raised section 88 of the flap 72. The raised section 88 of the flap 72 provides stiffening for the flap 72 in order to minimize bending when a torque is applied to the flap in its upright position without compromising the overall low profile of the fastener.

The angled geometry of the projecting hinge portions 78 also provides a degree of resilience in the pivotal connection of the flap 72 so that it is held down in its lowered position. In addition, biasing means in the form of a leaf spring 87 may be provided between the flange 86 and the projecting portion 78 for biasing the flap towards its lowered or upright position. The biasing of the flap in its lowered position is preferably sufficient to hold the flap 72 down against its own weight, so that even if the fastener 50 is turned upside down the flap remains closed. However, the flap 72 can be easily lifted with the finger against the action of the leaf spring. For this purpose, the outer diameter of the flap 72 is preferably slightly larger than the outer diameter of the second component 54 so that the flap marginally overlaps the second component 54 to facilitate lifting. In its upright position, the angled hinge portions 78 ensures that the flap 72 is not quite perpendicular to the upper face of the component 54 so that the flap will close by itself due to centrifugal force when rotated. Preferably the cut-out suction 80 in the flap 72 is not sufficiently large to enable a finger to be caught therein, but is large enough to receive the shaft of, for example, a screw driver to provide additional leverage if necessary.

It will be appreciated that the configuration of the flap 72 provides maximum leverage on the fastener 50 since it takes maximum advantage of the larger diameter of the second component 54. The hinge connection of the flap 72 is provided in the diametrical groove 76 and hence the groove 76 carries the load when a torque is applied to the gripping device, rather than the pivotal connection itself. The illustrated embodiment of the gripping device 70 is particularly advantageous since in the lowered position of the flap 72 it maintains the low profile of the fastener 50. Furthermore, since the gripping device is provided integral with the fastener 50 there is no possibility of the gripping device becoming misplaced, and thus having the inconvenience of a user having to locate the gripping device before being able to loosen the fastener. Not having to use a tool eliminates the danger of injury in the event the power tool is inadvertently switched ON. To loosen or tighten the fastener, the user simply lifts the flap 72 and applies a torque thereto in the appropriate direction to loosen or tighten the fastener.

Now that preferred embodiments of the fastener and a gripping device according to the invention have been described in detail, it will be apparent that both the fastener and the gripping device provide significant advantages over and improvements to conventional fasteners. Most importantly, the provision of a solid dry lubricant between the first and second components ensures that a significantly increased proportion of the torque applied to the fastener is converted to a hold-down pressure applied to the object to be fastened. The preferred embodiment of the fastener is particularly advantageous in its application to fastening of a grinder wheel, carving disc or circular saw blade to a power tool, since it facilitates easy manual securing and releasing of the disc or blade to/from the spindle of the power tool. As with a conventional clamp nut, the fastener of the invention can self-tighten spontaneously on the spindle when the power tool is switched ON, however the design of the fastener advantageously prevents overtightening. At a certain hold-down pressure (tightness) the friction between the thread on the threaded component and the thread on the spindle will exceed the friction between the threaded component and the first component (minimized due to the dry lubricant washer). At that pressure (or greater) the threaded component will not tighten any further as the first component will turn by itself with the, for example, grinding wheel, without the threaded component turning relative to the grinding wheel. Hence, the threaded component will never overtighten and can still be released manually without difficulty. Likewise, when the spindle decelerates after the tool is switched OFF, the same effect prevents the fastener from spontaneously loosening, and increases the safety of the power tool. The same "clutch" effect operates when the grinding wheel engages a work piece in use; the first component can accommodate a fraction of a revolution of slippage to reduce the shock on the gear box of the power tool. The teflon washer also absorbs a degree of vibration and this also helps to inhibit loosening of the fastener. Furthermore, the provision of a gripping device typically in the form of flap 72 provides an extremely effective means of manually applying a torque to the fastener.

Numerous variations and modifications will suggest themselves to persons skilled in the appropriate arts, other than those already described, without departing from the basic inventive concepts. For example, although both the illustrated embodiments employ a hollow threaded hub or hub for screw attachment to a spindle, clearly the hub or hub could be replaced with a threaded spindle provided integral to or locked to the second component 54. Furthermore, although in the preferred embodiment the first and second components are disc-shaped in order to give the fastener 50 an overall low profile so that it can be accommodated in the central depression of a grinding wheel, this is by no means essential to the present invention. The fastener may be of any desired shape, for example, the second component 54 may take the form of a conventional nut suitably modified on its pressure transmitting surface to accommodate the first component and the solid dry lubricant therebetween. The first component and the teflon washer may also be configured to fit within the securing nut of the kind used for securing a tool employing a Morse-tapered chuck, for example, as on straight shaft grinders and metal milling machines. Furthermore, the fastener need not have a gripping device in the form of a flap, but may instead have a larger profile and be provided with a grip surface. For similar reasons, the flap 72 of the gripping device need not be of semi-circular shape, but may be configured to match the shape of the upper surface of any fastener to which it is applied.

The solid dry lubricant need not be in the form of a washer-like closed ring, but may be of any suitable shape or configuration, for example, in the form of radially extending ribs located in matching recesses. Furthermore, the lubricating means need not be provided as a separate integer between facing surfaces of the first and second components, but may be provided integral to either one or both of the facing surfaces of the first and second components, for example, by manufacturing the component(s) from a suitable plastics material having a low coefficient of friction. Likewise, the annular spigot in the preferred embodiment may be replaced with a washer of suitably hard material, for example, stainless steel which may be used with two or more teflon washers to eliminate the need for a smooth bearing surface on either the first or second component.

It will be obvious that the gripping device 70 has much wider application to fasteners other than the fastener according to the present invention. For example, the gripping device 70 may also be provided integral to the head of a conventional screw or bolt or a drill chuck to facilitate manual fastening or turning of the same. All such variations and modifications are to be considered within the scope of the present invention the nature of which is to be determined from the forgoing description and the appended claims.

I claim:

1. A gripping device for manual tightening and/or loosening of a fastener, the device being provided integral to the fastener and comprising:

a substantially planar member pivotally connected to the fastener with the axis of pivot lying in a pivot plane substantially perpendicular to a direction of fastening of the fastener, said member being capable of pivoting about said pivot axis to an upright position in which it lies substantially parallel to the direction of fastening whereby, in use, said member can be manually grasped to apply a torque to the fastener, said pivot axis being proximate a planar torque transmitting surface provided substantially perpendicular to said pivot plane, said member engaging said planar torque transmitting surface in its upright position whereby, in use, when a torque is applied to the fastener by said member the load is carried substantially by said torque transmitting surface.

2. A gripping device as claimed in claim 1, wherein said axis of pivot passes through a central axis of the fastener, said central axis being parallel to said direction of fastening.

3. A gripping device as claimed in claim 2, wherein said fastener is a threaded fastener and has a top portion having a generally planar upper surface, said device being integral with said top portion.

4. A gripping device as claimed in claim 3, wherein said upper surface is of circular shape and said substantially planar member is in the form of a flap of semi-circular shape, said pivot axis lying on a diametrical axis of said upper surface.

5. A gripping device as claimed in claim 4, wherein said upper surface is provided with a recessed portion adapted to receive said flap in a lowered position, in which it lies flat in a plane substantially perpendicular to the direction of fastening.

6. A gripping device as claimed in claim 5, wherein said pivotal connection of said flap is provided with biasing means for biasing said flap in its lowered position.

7. A gripping device as claimed in claim 6, wherein said fastener is provided with a groove in which said pivotal connection of said planar member is located, the sides of said groove forming said torque transmitting surface, wherein said torque can be transmitted to the fastener by means of said planar member engaging the sides of said groove.

8. A gripping device as claimed in claim 7, wherein said flap is provided with a pair of projecting hinge portions received in said groove to form said pivotal connection.

9. A gripping device as claimed in claim 8, wherein said hinge portions are angled with respect to the remainder of the flap.

10. A fastener comprising:

first and second components assembled so as to be rotatable with respect to each other about a common axis, said first component having a first pressure transmitting surface adapted to bear against an object to be fastened and said second component having a threaded portion and being adapted to apply an axially directed compressive force to press the first component against said object when a torque is applied to said second component;

a solid dry lubricant material having a low coefficient of friction provided between said first and second components to reduce friction therebetween when one of the components is rotated relative to the other whereby, in use, said solid dry lubricant material can ensure that a significantly increased proportion of the torque applied to said second component to fasten said object can be converted to said compressive force transmitted through said first surface to said object; and containment means provided in connection with said first and/or second components for containing said solid dry lubricant material therein whereby, in use, said solid dry lubricant material is capable of withstanding substantial compressive loads without spreading from between the first and second components; and a gripping device comprising a substantially planar member pivotally connected to the fastener with the axis of pivot lying in a pivot plane substantially perpendicular to a direction of fastening of the fastener, said member being capable of pivoting about said pivot axis to an upright position in which it lies substantially parallel to the direction of fastening whereby, in use, said member can be manually grasped to apply a torque to the fastener, said pivot axis being proximate a torque transmitting surface provided substantially perpendicular to said pivot plane, said member engaging said torque transmitting surface in its upright position whereby, in use, when a torque is applied to the fastener by said member the load is carried substantially by said torque transmitting surface.

11. A fastener comprising:

first and second disc-shaped components assembled so as to be rotatable with respect to each other about a common axis, said first component having a first pressure transmitting surface adapted to bear against an object to be fastened and said second component having a threaded hub non-rotatably provided in connection therewith and which is rotatably received in a central aperture of the first component, said second component being arranged to apply an axially directed compressive force to press the first component against said object when a torque is applied to said second component;

a solid dry lubricant material in the form of an annulus provided between facing pressure transmitting surfaces of said first and second components and having a low coefficient of friction with at least one of the facing pressure transmitting surfaces so as to reduce friction therebetween, said solid dry lubricant material being contained in an annular recess provided in one of said first and second components wherein, in use, said solid dry lubricant material is capable of withstanding substantial compressive loads without spreading from between the first and second components;

said annular recess being provided adjacent said hub and having an outside diameter smaller than an outside diameter of said second component so that a contact area of said solid dry lubricant material with said facing pressure transmitting surfaces is minimized and a mechanical advantage is obtained when a torque is manually applied to the second component; and wherein, in use, said solid dry lubricant material ensures that a significantly increased proportion of the torque applied to said second component to fasten said object is converted to said compressive force transmitted through said first pressure transmitting surface to said object.

12. A fastener as claimed in claim 11, wherein said annular recess is provided immediately adjacent an outer periphery of said hub.

13. A fastener as claimed in claim 9 wherein said solid dry lubricant material is a fluoropolymer plastic.

14. A fastener as claimed in claim 11, wherein the width of said annular recess is less than substantially one-quarter the radius of said second component.

15. A fastener as claimed in claim 11, further comprising a matching annular spigot provided in connection with the other of said first and second components, and adapted to bear against said solid dry lubricant material in said annular recess.

16. A fastener as claimed in claim 15, wherein the height of the annular spigot relative to the depth of the annular recess is selected so that the remainder of the facing surfaces of the first and second components are normally separated by an air gap whereby, in use, said annular spigot and annular recess each normally provide the only pressure transmitting surfaces of the facing surfaces of said first and second components.

17. A fastener comprising:

first and second disc-shaped components assembled so as to be rotatable with respect to each other about a common axis, said first component having a first pressure transmitting surface adapted to bear against an object to be fastened and said second component having a threaded hub which is formed separately from said second component and is non-rotatably located in a central aperture of said second disc-shaped component and which is rotatably received in a central aperture of the first component, said second component being arranged to apply an axially directed compressive force to press the first component against said object when a torque is applied to said second component;

a solid dry lubricant material in the form of an annulus provided between facing pressure transmitting surfaces of said first and second components and having a low coefficient of friction with at least one of the facing pressure transmitting surfaces so as to reduce friction therebetween, said solid dry lubricant material being contained in an annular recess provided in one of said first and second components wherein, in use, said solid dry lubricant material is capable of withstanding substantial compressive loads without spreading from between the first and second components;

said annular recess being provided adjacent said hub and having an outside diameter smaller than an outside diameter of said second component so that a contact area of said solid dry lubricant material with said facing pressure transmitting surfaces is minimized and a mechanical advantage is obtained when a torque is applied manually to the second component; and wherein, in use, said solid dry lubricant material ensures that a significantly increased proportion of the torque applied to said second component to fasten said object is converted to said compressive force transmitted through said first pressure transmitting surface to said object.

18. A fastener comprising:

first and second disc-shaped components assembled so as to be rotatable with respect to each other about a common axis, said first component having a first pressure transmitting surface adapted to bear against an object to be fastened and said second component having a threaded hub which is rotatably received in a central aperture of the first component, said second component being arranged to apply an axially directed compressive force to press the first component against said object when a torque is applied to said second component;

a solid dry lubricant material in the form of an annulus provided between facing pressure transmitting surfaces of said first and second components and having a low coefficient of friction with at least one of the facing pressure transmitting surfaces so as to reduce friction therebetween, said solid dry lubricant material being contained in an annular recess provided in one of said first and second components wherein, in use, said solid dry lubricant material is capable of withstanding substantial compressive loads without spreading from between the first and second components;

said annular recess being provided adjacent said hub and having an outside diameter smaller than an outside diameter of said second component so that a contact area of said solid dry lubricant material with said facing pressure transmitting surfaces is minimized and a mechanical advantage is obtained when a torque is manually applied to the second component;

wherein, in use, said solid dry lubricant material ensures that a significantly increased proportion of the torque applied to said second component to fasten said object is converted to said compressive force transmitted through said first pressure transmitting surface to said object; and a second annular recess provided in one of said first and second components intermediate said first annular recess and an outer periphery of said one of the first and second components, said second annular recess containing a dust washer for inhibiting the ingress of dust and other contaminants into the space between the first and second components.

* * * * *